(12) United States Patent
Jo et al.

(10) Patent No.: US 9,131,470 B2
(45) Date of Patent: Sep. 8, 2015

(54) RESOURCE ALLOCATION IN A COEXISTENCE SYSTEM

(75) Inventors: Junho Jo, Anyang-si (KR); Gosan Noh, Seoul (KR); Daesik Hong, Seoul (KR); Bonghoe Kim, Anyang-si (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 161 days.

(21) Appl. No.: 14/009,230

(22) PCT Filed: Nov. 17, 2011

(86) PCT No.: PCT/KR2011/008792
§ 371 (c)(1),
(2), (4) Date: Oct. 1, 2013

(87) PCT Pub. No.: WO2012/134023
PCT Pub. Date: Oct. 4, 2012

(65) Prior Publication Data
US 2014/0038657 A1 Feb. 6, 2014

Related U.S. Application Data

(60) Provisional application No. 61/470,492, filed on Apr. 1, 2011.

(51) Int. Cl.
*H04W 72/00* (2009.01)
*H04W 16/14* (2009.01)

(52) U.S. Cl.
CPC ............ *H04W 72/005* (2013.01); *H04W 16/14* (2013.01)

(58) Field of Classification Search
CPC .......... H04W 16/14; H04B 1/44; H04B 1/525
See application file for complete search history.

(56) References Cited

U.S. PATENT DOCUMENTS 8,379,586 B2 * 2/2013 Kasslin et al. ................ 370/329
8,547,919 B2 * 10/2013 Karlsson et al. .............. 370/329
(Continued)

FOREIGN PATENT DOCUMENTS

JP      2012-502545      1/2012
KR    1020100097497 A    9/2010
(Continued)

OTHER PUBLICATIONS

Korean Intellectual Property Office Application Serial No. 10-2013-7028197, Notice of Allowance dated Feb. 25, 2015, 2 pages.

*Primary Examiner* — Bobbak Safaipour
(74) *Attorney, Agent, or Firm* — Lee, Hong, Degerman, Kang & Waimey

(57) ABSTRACT

One embodiment disclosed in the present description relates to a coexistence manager which can adaptively select channels in a coexistence environment between disparate systems with channel use constraints that inherently exist with use of TVWS. Accordingly, the embodiment disclosed in the present description provides a resource allocation method for a manager device, comprising the steps of: receiving a channel allocation request from a first network or device; determining a second network or device for switching channels based on the benefits of each channel or device, if a channel cannot be assigned to the first network or device; switching the channel used by the second network or device to another channel and raising its priority; and assigning the channel used by the second network or device to the first network or device.

15 Claims, 19 Drawing Sheets

(56) References Cited

U.S. PATENT DOCUMENTS

| | | | |
|---|---|---|---|
| 8,615,250 B2* | 12/2013 | Xing | 455/454 |
| 8,874,152 B2* | 10/2014 | Sun et al. | 455/501 |
| 2008/0259859 A1* | 10/2008 | Cordeiro et al. | 370/329 |
| 2010/0195667 A1* | 8/2010 | Wang et al. | 370/466 |
| 2010/0222055 A1* | 9/2010 | Cho et al. | 455/434 |
| 2011/0141999 A1* | 6/2011 | Karlsson et al. | 370/329 |
| 2013/0163531 A1* | 6/2013 | Kim | 370/329 |
| 2013/0235814 A1* | 9/2013 | Wietfeldt et al. | 370/329 |
| 2014/0038657 A1* | 2/2014 | Jo et al. | 455/509 |

FOREIGN PATENT DOCUMENTS

| | | |
|---|---|---|
| KR | 10-20100114828 A | 10/2010 |
| WO | 2010/027306 | 3/2010 |
| WO | 2010114640 A1 | 10/2010 |

* cited by examiner (a)

(b)

RESOURCE ALLOCATION IN A COEXISTENCE SYSTEM

CROSS-REFERENCE TO RELATED APPLICATIONS

This application is the National Stage filing under 35 U.S.C. 371 of International Application No. PCT/KR2011/008792, filed on Nov. 17, 2011, which claims the benefit of U.S. Provisional Application Ser. No. 61/470,492, filed on Apr. 1, 2011, the contents of which are all hereby incorporated by reference herein in their entirety.

BACKGROUND OF THE INVENTION

1. Field of the Invention

The present invention relates to a resource allocation method of a manager device that services a network or a device.

2. Related Art

In the related art, a frequency is allocated for a new service or the frequency is allocated to a new provider under the supervision of a government.

In particular, when new providers emerge, a new frequency is allocated through an auction or an existing frequency is collected from an existing provider and relocated to another provider to distribute a frequency which is a limited resource.

However, in recent years, as a demand of radio data traffic has explosively increased with the spread of various wireless Internet based applications such as an open type terminal platform, an app. Store, a mobile VoIP, and the like, the frequency allocation under the supervision of the government is very inefficient and fundamentally, it is gradually difficult to secure the new frequency on a frequency allocation table.

In particular, with rapid growth of broadcast and communication systems, a next-generation communication system has been designed by merging various networks and the system has become gradually complicated and the need of interworking has been gradually extended. Further, with the development of a communication technology and a communication service, a use frequency for the use of a frequency resource has increased and s a specific frequency band is fixedly occupied in order to provide excellent communication technologies and services, a problem of frequency exhaustion is in a critical situation.

In recent years, as a way to solve such a problem, a frequency sharing scheme has attracted public attention. A current frequency shortage phenomenon is caused by an existing partition type frequency management scheme and the frequency seems to be short on the frequency allocation table, but the frequency sharing scheme starts by considering that the frequency shortage problem can be solved through the sharing scheme.

As people recognize that the exhaustion problem of the frequency resource is important, US Federal Communications Commission (FCC) is supposed to apply cognitive radio technology which is frequency sharing technology to a TV idle frequency (white space) in order to increase spectrum usage efficiency and easily introduce a new service and has revised related rules.

Such a movement is gradually extended, and UK has permitted using cognitive radio (CR) based frequency sharing technology in a band which is not spatially used, that is, a white space band in a TV broadcast band, and EU is also reviewing a current introduction mechanism and a preparation for establishing a frequency sharing policy using the white space band is made in Korea.

The cognitive radio technology is a system in which a communication device observes a communication environment of itself, determines and selects an operating mechanism for optimal communication, and establishes a plan for a further determination process from a previous communication experience. That is, the cognitive radio technology is technology finding a spectrum hole (white space) which is low in its utilization or is temporally/spatially unused in a frequency band allocated to an unlicensed band and adaptively and opportunistically using the spectrum hole. In this case, when a primary user having a license is discovered in the corresponding band, the cognitive radio technology needs to operate so as to prevent the primary from being damaged by immediately stopping the use of the corresponding band or controlling transmission power.

An important matter to be considered when different types of systems coexist in a TV whitespace (TVWS) is channel selection (or resource allocation) for disparate systems having different bandwidths. Empty channels except for channels used by the primary user among all TV channels have different areas (or widths). Therefore, a system which can be used according to the area of the empty channel is changed. That is, when an empty space is wide, a system having a wide bandwidth may be used, but if the empty space is narrow, only a system using a narrow bandwidth may be used. Therefore, even though the empty space is present, the corresponding channel cannot be unconditionally used and a constraint is added, that the area of the bandwidth of a system to coexist is equal to or smaller than the area of the empty space.

Since the primary user uses the channel without a constraint, a distribution of the empty space is generated on the TVWS. Further, a TVBD network or devices 100 using the TVWS use an empty channel not used by the primary user if there is no separate constraint as a secondary user. In this case, a channel fragmentation phenomenon in which the empty channel does not concentrate on one location but is scattered by the small unit may occur. Adjacent channels are exhausted due to the phenomenon to prevent a wideband system using plural TV channels which are bound from using the channel. The phenomenon may occur in the wideband system rather than a narrowband system using only one TV channel.

SUMMARY OF THE INVENTION

One embodiment disclosed in the present description is to provide a coexistence manager which can adaptively select channels in a coexistence environment between disparate systems with channel use constraints that inherently exist with use of TVWS. That is, one embodiment disclosed in the description is to, when a wideband system cannot use channels because channels which are consecutively empty are not present even though empty channels are actually present, secure consecutively empty channels required by the wideband system by transferring channels used by a narrowband system to other channels. Further, another embodiment disclosed in the description is to provide a reference for selecting a channel transferring target and a technique of selecting a transferred channel in implementing an adaptive channel selecting technique.

In accordance with an aspect of the present invention, there is provided a resource allocation method of a manager device, including the steps of: receiving a channel allocation request from a first network or a device; deciding a second network or a device to transfer a used channel based on channel gains of respective networks or devices when there is no channel to be allocated to the first network or device; transferring a used channel of the second network or device to another channel and increasing a priority; and allocating the used channel of the second network or device to the first network or device.

According to one embodiment disclosed in the description, blocking of the wideband system which is a problem caused due to a channel fragmentation phenomenon is prevented and the number of usable channels is increased by the channel transferring technique to thereby improve channel usage efficiency. Further, according to one embodiment disclosed in the description, frequency usage efficiency is increased in a general purpose in which an 802.19.1 system structure and the disparate systems.

DESCRIPTION OF EXEMPLARY EMBODIMENTS

Figure 10:
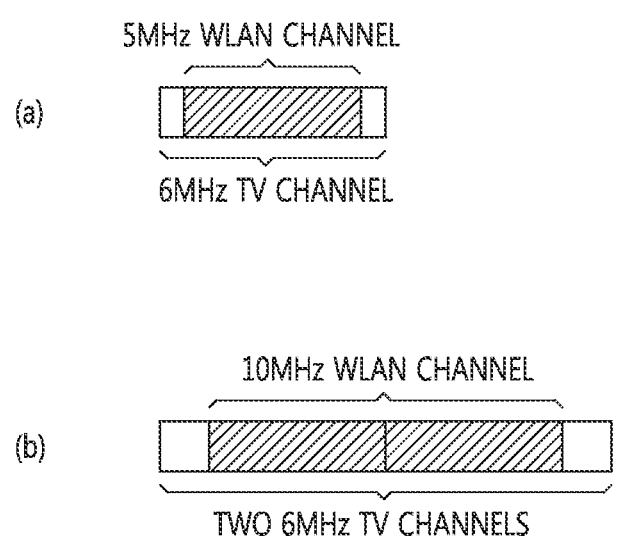

Sub-figures (a) and (b) of FIG. 10 are diagrams illustrating a channel use structure of the coexistence system according to the embodiments disclosed in the present description.

Figure 11:
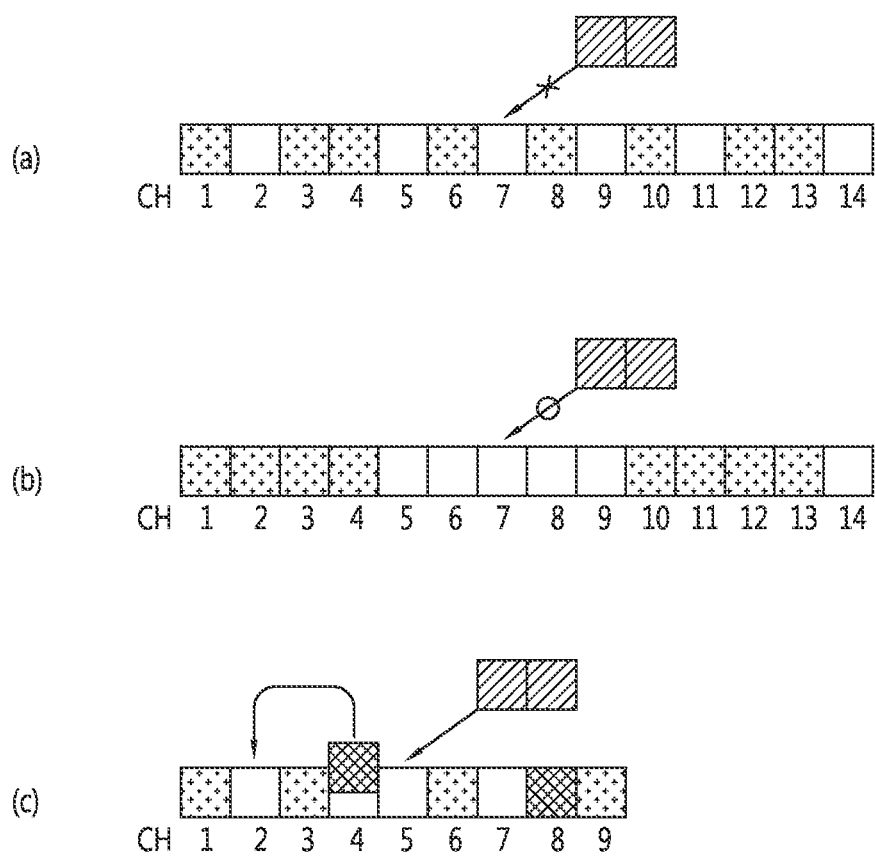

Sub-figures (a) to (c) of FIG. 11 are conceptual diagrams for describing a channel fragmentation phenomenon which occurs in the coexistence system.

Figure 12:
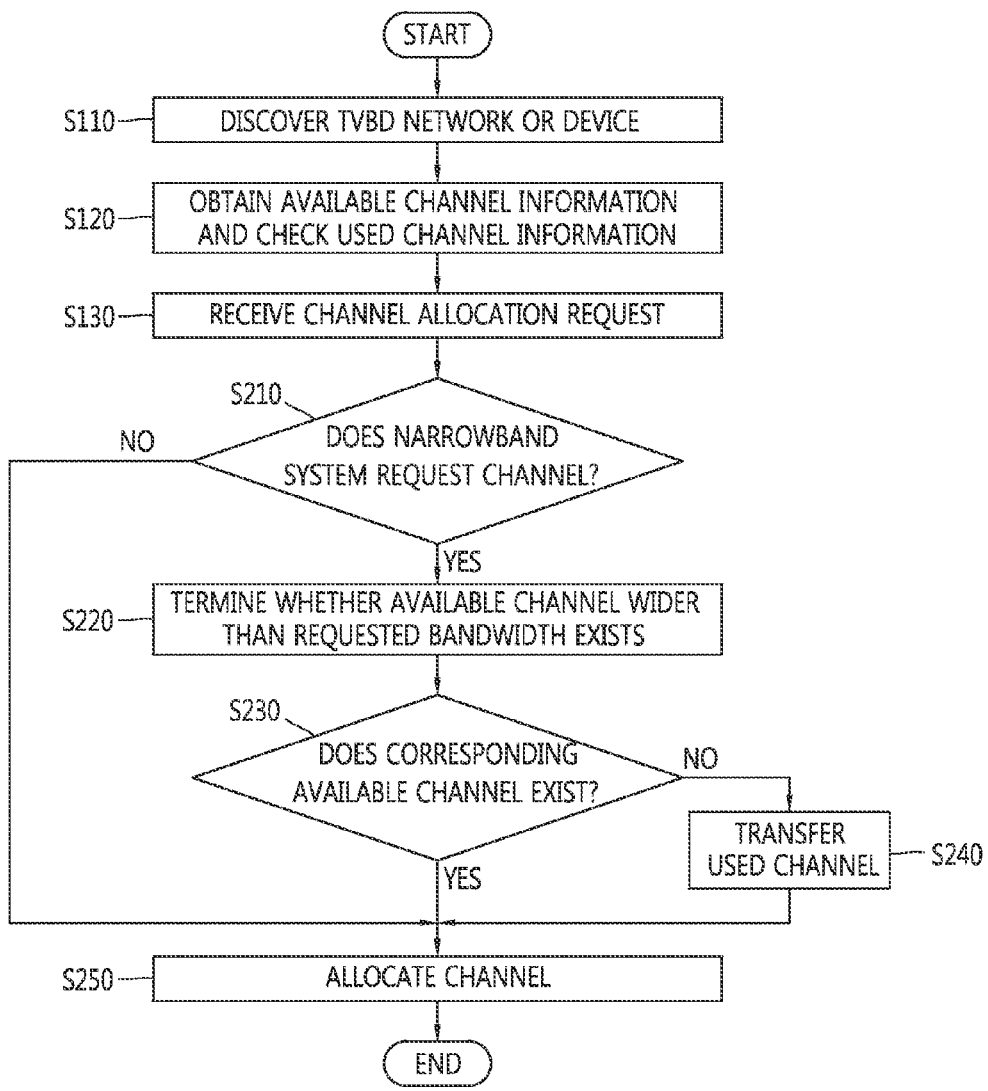

FIG. 12 is a flowchart illustrating a channel allocation process adopting an adaptive channel selection technique of the coexistence system according to the embodiments disclosed in the present description.

Figure 13:
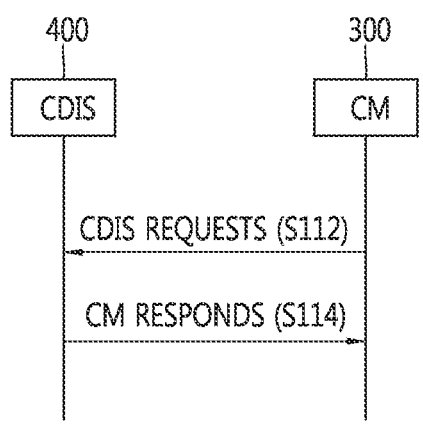

FIG. 13 is a flowchart specifically illustrating a process (S110) of discovering a TVBD network or device 100 illustrated in FIG. 12.

Figure 14:
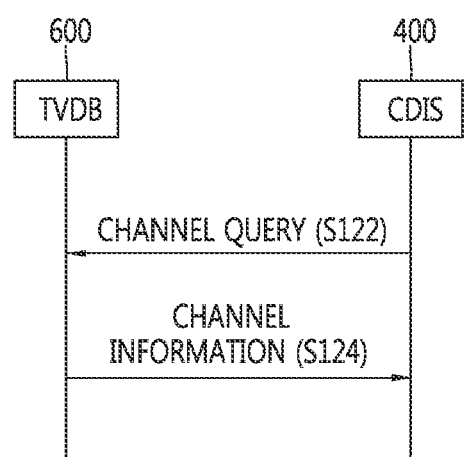

FIG. 14 is a flowchart specifically illustrating a process (S120) of acquiring a currently usable channel set illustrated in FIG. 12.

Figure 15:
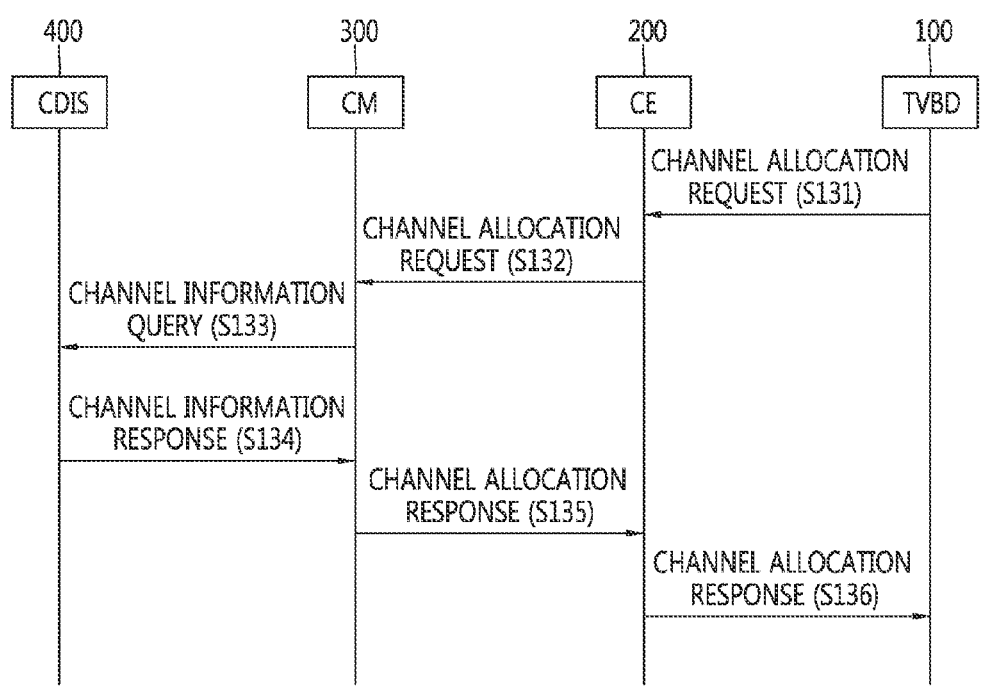

FIG. 15 is a flowchart specifically illustrating a process (S130) of receiving a channel allocation request illustrated in FIG. 12.

Figure 16:
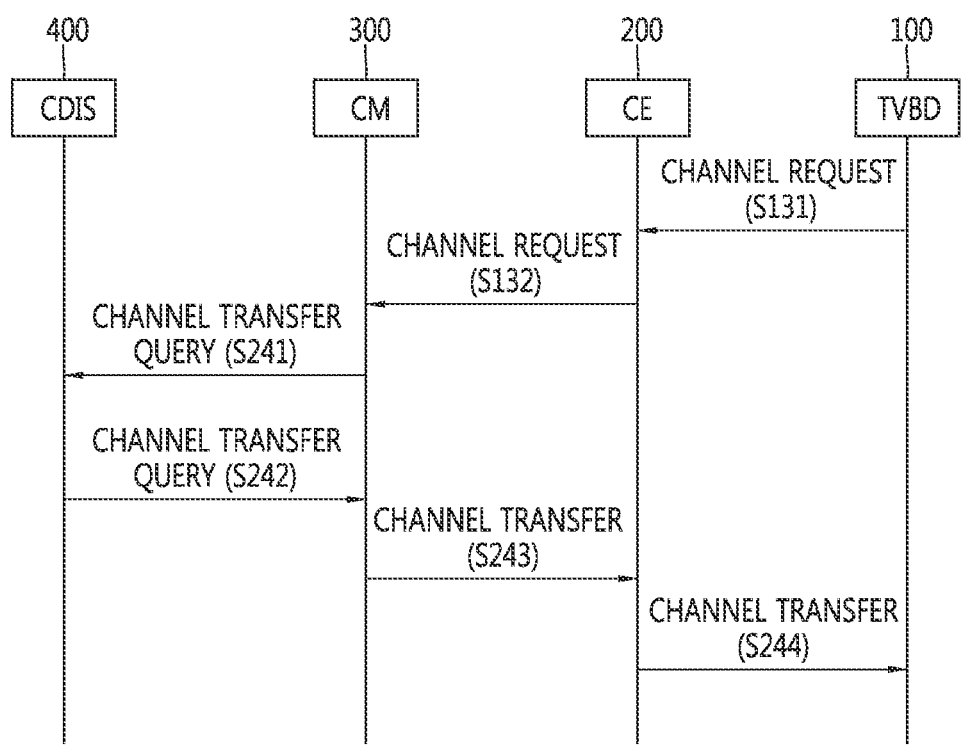

FIG. 16 is a flowchart specifically illustrating a channel transferring process (S240) illustrated in FIG. 12.

Figure 17:
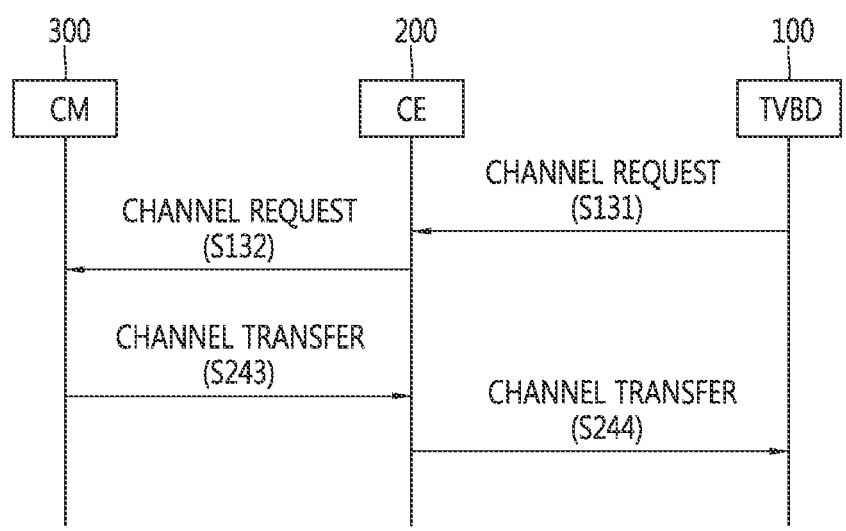

FIG. 17 is a flowchart specifically illustrating a channel transferring process (S240) illustrated in FIG. 12.

Figure 18:
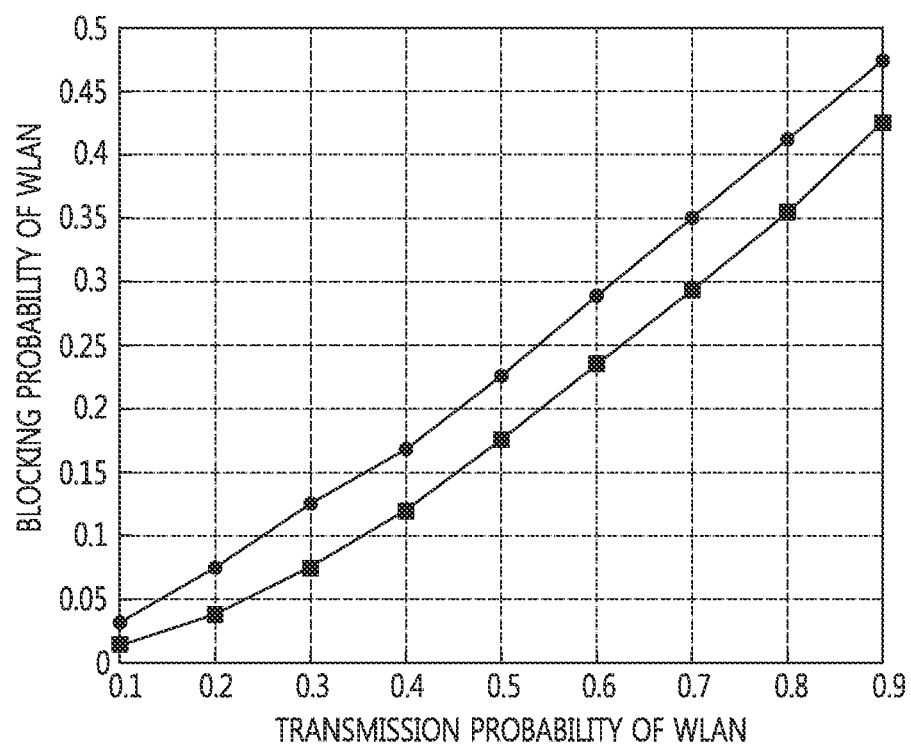

FIG. 18 is a diagram illustrating a performance improvement verification test result of the coexistence system according to the embodiment disclosed in the present description.

Figure 19:
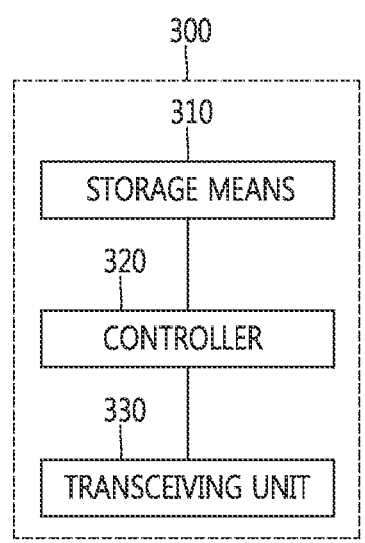

FIG. 19 is a block diagram of a coexistence manager (CM) 300 disclosed in the present description.

DESCRIPTION OF EXEMPLARY EMBODIMENTS

It is noted that Technical terms used in the specification are used to just describe a specific embodiment and do not intend to limit the present invention. Further, if the technical terms used in the specification are not particularly defined as other meanings in the specification, the technical terms should be appreciated as meanings generally appreciated by those skilled in the art and should not be appreciated as excessively comprehensive meanings or excessively reduced meanings. Further, when the technical term used in the specification is a wrong technical term that cannot accurately express the spirit of the present invention, the technical term is substituted by a technical term which can correctly appreciated by those skilled in the art to be appreciated. In addition, a general term used in the present invention should be analyzed as defined in a dictionary or according to front and back contexts and should not be analyzed as an excessively reduced meaning.

Moreover, if singular expression used in the specification is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first', 'second', etc. can be used to describe various components, but the components should not be limited by the terms. The above terminologies are used only to discriminate one component from the other component. For example, a first component may be named as a second component and similarly, the second component may also be named as the first component.

It should be understood that, when it is described that an element is "coupled" or "connected" to another element, the element may be "directly coupled" or "directly connected" to the another element or "coupled" or "connected" to the another element through a third element. In contrast, it should be understood that, when it is described that an element is "directly coupled" or "directly connected" to another element, it is understood that no element is not present between the element and the another element.

Hereinafter embodiments of the present invention will be described in detail with reference to the accompanying drawings, in which like or similar reference numerals refer to like elements regardless of reference numerals and a duplicated description thereof will be omitted. In describing the present invention, when it is determined that the detailed description of the known art related to the present invention may obscure the gist of the present invention, the detailed description thereof will be omitted. Further, it is noted that the accompanying drawings are used just for easily appreciating the spirit of the present invention and it should not be analyzed that the spirit of the present invention is limited by the accompanying drawings. It should be analyzed that the spirit of the present invention is extended up to all changes, equivalents, or substitutions in addition to the accompanying drawings.

Hereinafter, a term called a terminal is used, but the terminal may be called user equipment (UE), mobile equipment (ME), a mobile station (MS), a user terminal (UT), a subscriber station (SS), a mobile subscriber station (MSS), a wireless device, a handheld device, or an access terminal (AT).

A IEEE 802.11 wireless local area network (WLAN) standard provides transmission speeds of 11 Mbps (IEEE 802.11b) and 54 Mbps (IEEE 802.11a) using a unlicensed band in 2.4 GHz or 5 GHz.

IEEE 802.11g provides a transmission speed of 54 Mbps by applying orthogonal frequency-division multiplexing (OFDM) in 2.4 GHz.

IEEE 802.11n provides a transmission speed of 300 Mbps to four spatial streams by applying MIMO-OFDM. IEEE 802.11n supports a channel bandwidth of up to 40 MHz and in this case, provides a transmission speed of 600 Mbps.

A TV whitespace includes a VHF band (54 to 60, 76 to 88, 174 to 216 MHz) and a UHF band (470 to 698 MHz) allocated to a broadcast TV system and means a frequency band of which the use is permitted for a unlicensed device under a condition not to hinder communication of a licensed device (a TV broadcast and radio microphone, or the like) that operates in the corresponding frequency band.

Meanwhile, TVWS is an abbreviation of the TV whitespace and the white space means an empty frequency band not used by a broadcast provider in VHF and UHF frequency bands allocated for TV broadcast and means an unlicensed band which can be used by anybody when anybody conforms to a condition regarding radio wave regulation of a government. That is, the TV whitespace may mean frequency information for broadcast. In detail, the TV whitespace spatially means an empty band by worrying about frequency interference between broadcast providers, a frequency band which is not used regionally or a region which a broadcasting radio wave does not reach, and temporally means a broadcast frequency which is empty during a time when a broadcast provider does not transmit a broadcast at dawn. The TV whitespace interferes in a TV viewer which is a client of the broadcast provider to hinder the TV viewer from receiving the broadcast and further, should not influence a wireless microphone device which communicates with a small output by using a part of the band.

In an operation of the TV white space is permitted for all unlicensed devices in 512 to 608 MHz and 614 to 698 MHz except for some special cases, but the TV white space is permitted for only communication between fixed devices in bands of 54 to 60 MHz, 76 to 88 MHz, 174 to 216 MHz, and 470 to 512 MHz. The fixed device is a device that performs transmission at only a predetermined location.

An IEEE 802.11 TVWS terminal is an unlicensed device that operates by using IEEE 802.11 MAC and PHY in a TV whitespace spectrum.

An unlicensed user who desires using the TV whitespace needs to provide a protection function for a licensed user. Therefore, the unlicensed user needs to check whether the licensed user occupies the corresponding band before starting transmission in a TV band.

To this end, the unlicensed device needs to obtain channel list information usable in a corresponding region by accessing a location information database (geo-location database) through the Internet or a dedicated network. The geo-location database is a database that stores and manages information on the licensed device registered therein, and channel usage information which is dynamically changed according to location information and a usage time of the licensed devices.

A station (STA) performs a spectrum sensing mechanism. As the spectrum sensing mechanism, an energy detection mechanism, a feature detection mechanism, and the like are used. When the intensity of a received signal is equal to or more than a predetermined value, it is determined that an incumbent user uses a channel or when a DTV preamble is detected, it is determined that the incumbent user uses the channel. In addition, when it is determined that the incumbent user uses a channel directly adjacent to the currently used channel, the STA and an access point (AP) needs to lower transmission power.

Figure 1:
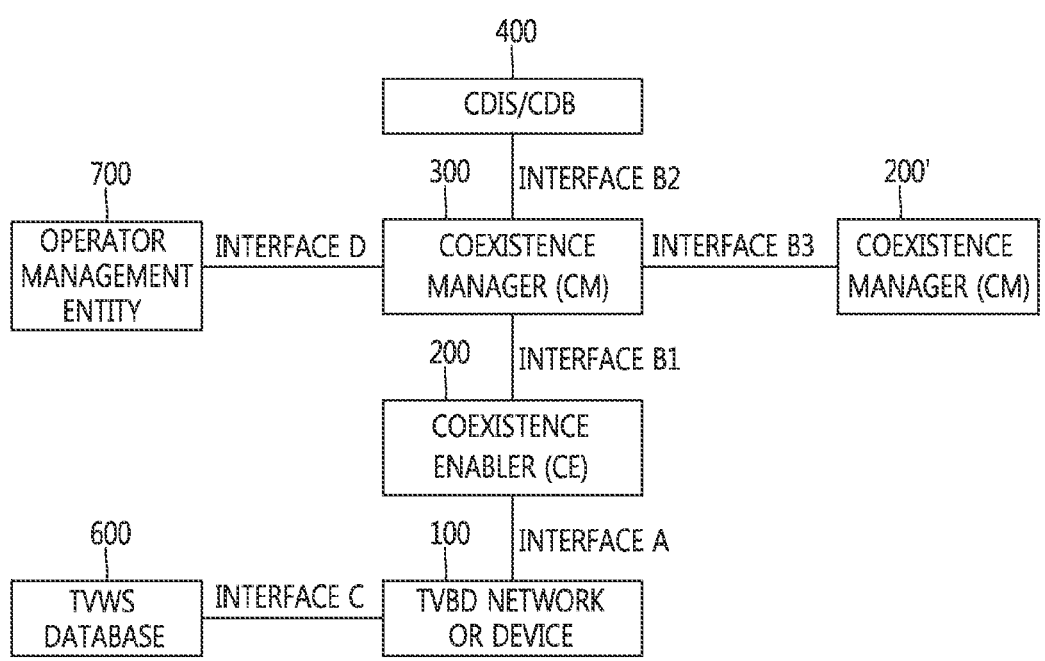
FIG. 1 is a block diagram illustrating a coexistence system according to an embodiment of the present description.

FIG. 1 is a block diagram illustrating a coexistence system according to an embodiment of the present description. As illustrated in FIG. 1, the coexistence system includes a coexistence enabler (CE) 200, a coexistence manager (CM) 300 and a coexistence discovery and information server (CDIS) or a coexistence database (CDB) 400.

The coexistence manager (CM) 300 and the coexistence enabler (CE) 200 are logical entities defined for coexistence between different wireless systems which operate in an unlicensed state or wireless providers in the TV whitespace. The coexistence manager (CM) 300 is an object that may perform resource allocation in order to solve a problem regarding interfaces between the coexistence enablers (CE) 200 connected thereto while providing a policy and a guide line associated with coexistence between the coexistence between different systems having a TVWS database and a TVWS database, which that operate in the TVWS.

The coexistence enabler (CE) 200 is an object that serves to transfer information and commands from the coexistence manager (CM) 300 with an interface with a TVBD network or a device 100 to the TVBD network or the device 100. In the description, the STAs may perform functions of the coexistence enablers (CEs) 200, and a coexistence network structure having a management entity such as the coexistence manager (CM) 300 as a superior object that may control the plural coexistence enablers (CEs) 200 is disclosed.

The coexistence enabler (CE) 200 receives information or commands associated with coexistence from the coexistence manager (CM) 300. The coexistence enabler (CE) 200 converts the received information or commands into media specific type of information or commands and transfers the converted information or commands to the TVBD network or the device 100 for an operation of the TVBD network or the device 100 required by a corresponding message. Similarly, the information received from the TVBD network or the device 100 is converted into a format of a message defined in the coexistence system by the coexistence enabler (CE) 200 to be transmitted to the coexistence manager (CM) 300. Since the coexistence enabler (CE) 200 is positioned in the TVBD network or the device 100, a service access point (SAP) and a primitive with the management entity of the TVBD network or the device 100 needs to be defined in order to transfer information and command for coexistence.

The coexistence manager (CM) 300 may service one or more coexistence enablers (CE) 200. The coexistence manager (CM) 300 may obtain required information from an external entity such as the TVWS database, the coexistence enabler (CE) 200 served thereby, or another coexistence manager (CM) 300. The coexistence manager (CM) 300 sends and receives information or a command message to and from another coexistence manager (CM) 300 or transmits information or commands to the coexistence enabler (CE) 200 serviced thereby. The coexistence manager (CM) 300 makes a coexistence decision based on the obtained information and the decision may include deciding an operating channel, a maximum transmitted power value, and the like of the coexistence enabler (CE) 200 serviced thereby.

The TVBD network or the device 100 as an unlicensed user using the TV band may be a device or a network. For example, the TVBD network or the device 100 may be a device that operates in a master mode, such as an access point (AP) or a base station (BS). The AP and BS may communicate with the coexistence manager (CM) 300 for coexistence while operating in the master mode and manage/control devices that operate in a slave mode.

The CDIS 400 has an interface with the coexistence manager (CE) 300, and may obtained and manage from the coexistence manager (CM) 300 information associated with the coexistence manager (CE) 300 serviced thereby and the coexistence enabler (CE) 200 serviced by the corresponding coexistence manager (CM) 300, for example, location information (geo-location) of the TVBD network or the device 100 serviced by the coexistence enabler (CE) 200 or usable channel list information which the TVBD network or the device 100 obtains from the TVWS database, a measurement result of the TVBD network or the device 100, a list of the coexistence enabler (CE) 200 serviced by the coexistence manager (CM) 300, and the like.

The CDIS 400 may calculate neighbor relationships between the coexistence managers (CMs) 300 serviced thereby and between the coexistence enablers (CEs) 200. That is, when a specific TVBD network or device 100 is considered, which TVBD network or device 100 has an interfering relationship with the corresponding TVBD network or device 100 and which coexistence enabler (CE) 200 and coexistence manager (CM) 300 service the corresponding TVBD network or device 100 may be calculated.

The coexistence enabler (CE) 200 sets a connection with the coexistence manager (CM) 300 and registers the coexistence enabler (CE) 200 itself in the corresponding coexistence manager (CM) 300 in order to use a coexistence service. The coexistence manager (CM) 300 needs to set a connection with a neighboring coexistence manager (CM) 300. The coexistence manager (CM) 300 manages the coexistence enablers (CEs) 200 registered therein and provide the service for coexistence to the coexistence enablers (CEs) 200. Topology in which the coexistence manager (CM) 300 makes a decision for coexistence while managing the multiple coexistence enablers (CEs) 200 is called centralized topology. Since a decision maker is the coexistence manager (CM) 300 in the centralized topology, the coexistence enabler (CE) 200 follows decision making of the coexistence manager (CM) 300.

Hereinafter, each component in the coexistence system will be described in more detail.

The coexistence enabler (CE) 200 is connected with the coexistence manager (CM) 300 through an interface B1, the coexistence manager (CM) 300 is connected with the CDIS or CDB 400 through an interface B2, and the coexistence (CM) 300 is connected with another coexistence manager (CM) 200' through an interface B3.

Further, the coexistence enabler (CE) 200 is connected with the TVBD network or device 100 through an interface A. Here, the TVBD network or device 100 means a terminal which can use a TV whitespace in the Federal Communication Commission (FCC). The TVBD network or device 100 may be connected with the TVWS database 600 through the interface C.

The coexistence enabler (CE) 200 may request and acquire information required for coexistence from the TVBD (TeleVision Band Device) network or device 100, and converts reconfiguration change requests/commands received from the coexistence manager (CM) 300 and control information into TVBD specific reconfiguration requests/commands to transmit the converted TVBD specific reconfiguration requests/commands to the TVBD network or device 100.

The coexistence manager (CM) 300 may have a function of discovering other CMs, a coexistence decision making function for generating the corresponding coexistence requests/commands and control information and providing those to the coexistence enabler CE (200), and a function for supporting exchange of information required for the coexistence between the CMs (which may include hierarchical and/or peer-to-peer capabilities when the CMs are disposed) in order to solve the coexistence problem between the TVBD networks.

Further, the coexistence manager (CM) 300 may have a function of selecting a representative coexistence manager by sharing information regarding coexistence managers, a function of generating a coexistence whitespace map for effectively sharing a frequency resource between other networks and systems to be described below, and a function of assisting network operators when management associated with the TVWS coexistence is performed.

Such a coexistence manager (CM) 300 may be implemented in an embedded form in a device such as an access point (AP) or a base station, and may be implemented outside of the device.

The CDIS/CDB 400 may be represented as a CDIS or a CDB according to a function. The CDIS/CDB 400 may have a function of generating a coexistence whitespace map or a coexistence map in order to effectively share a frequency resource between other networks and systems, a function of controlling a plurality of operators when management associated with the TVWS coexistence is performed, and a function of calculating a representative CM in order to reduce a communication overhead between the coexistence managers (CMs) and solve the coexistence problem.

Further, the CDIS/CDB 400 may perform a function of calculating a coexistence contour in order to search adjacent networks/systems, a function of redirecting a coexistence whitespace map or a coexistence map in accordance with the TVDB in order to solve the coexistence problem, a function of supporting search of the coexistence managers (CMs) by promoting opening of an interface between the coexistence managers (CMs), and a function of collecting, integrating, and providing information which may promote the coexistence (which includes data storage, and data processing).

The CDIS/CDB 400 may omnipotently divide a resource when allocating the resource, or indicate a reference of priority between the coexistence managers (CM) 300 as intermediaries and perform coordination for resource selection of each coexistence manager (CM) 300, or act as information sharing media between external and different networks between the coexistence managers (CM) 300 as the data base (DB).

Meanwhile, the interface A is an interface between the coexistence enabler (CE) 200 and the TVBD network or device 100, and information required for coexistence, a configuration/information request for coexistence, and a configuration/measurement/information response for coexistence, and other information as necessary may be provided from the TVBD network or device 100. Reconfiguration requests/demands and control information (corresponding to coexistence requests/demands and control information received from the CM), requests/commands associated with controlling a measurement value performed by the TVBD network or device 100, and information of notifying a usable resource, and other information as necessary may be provided from the coexistence enabler (CE) 200 to the TVBD network or device 100.

The interface B1 is an interface between the coexistence enabler (CE) 200 and the coexistence manager (CM) 300, and information required for coexistence (information acquired from the TVBD network or device 100) and other information as necessary may be provided from the coexistence enabler (CE) 200 to the coexistence managers (CM) 300. Coexistence requests/commands and control information and other information as necessary may be provided from the coexistence manager (CM) 300 to the coexistence enabler (CE) 200.

The interface B2 is an interface between the coexistence manager (CM) 300 and the CDIS/CDB 400, and information required for a coexistence map, information required for a neighbor set, information required for register/unenrolled, information required for search (acquired by the currently used CM), information required for coexistence, and other information as necessary may be provided from the coexistence manager (CM) 300 to the CDIS/CDB 400.

Information notified for a coexistence map, information notified for a neighbor set (or a neighbor list), information notified for a representative CM, information required for search (acquired for another CM), information required for coexistence, and other information as necessary may be provided from the CDIS/CDB 400 to the coexistence manager (CM) 300.

The interface B3 is an interface between the coexistence manager (CM) 300 and another coexistence manager (CM) 300', and information and message required for search and coexistence, information notified for register/unregister (from the coexistence manager (CM) 300 to the representative coexistence manager (CM), or from the coexistence manager (CM) of the device to the coexistence manager (CM) of the server), information notified for a coexistence map (from the CM to the representative CM or from the CM of the server to the CM of the device), information required for policy exchange/negotiation, other information as necessary, and the like may be provided from the coexistence manager (CM) 300 to another coexistence manager (CM) 300'.

The interface C is an interface between the TVBD network or device 100 and the TVWS data base 600, and information notified for an available channel may be provided from the TVWS DB 600 to the TVBD network or device 100.

The interface D is an interface between the coexistence manager (CM) 300 and the operator management entity (OME) 700, and information on a network operation associated with the information (for example, a limiting factor associated with operation of a spectrum policy/network), and other information as necessary may be provided from the OME 700 to the coexistence manager (CM) 300.

Figure 2:
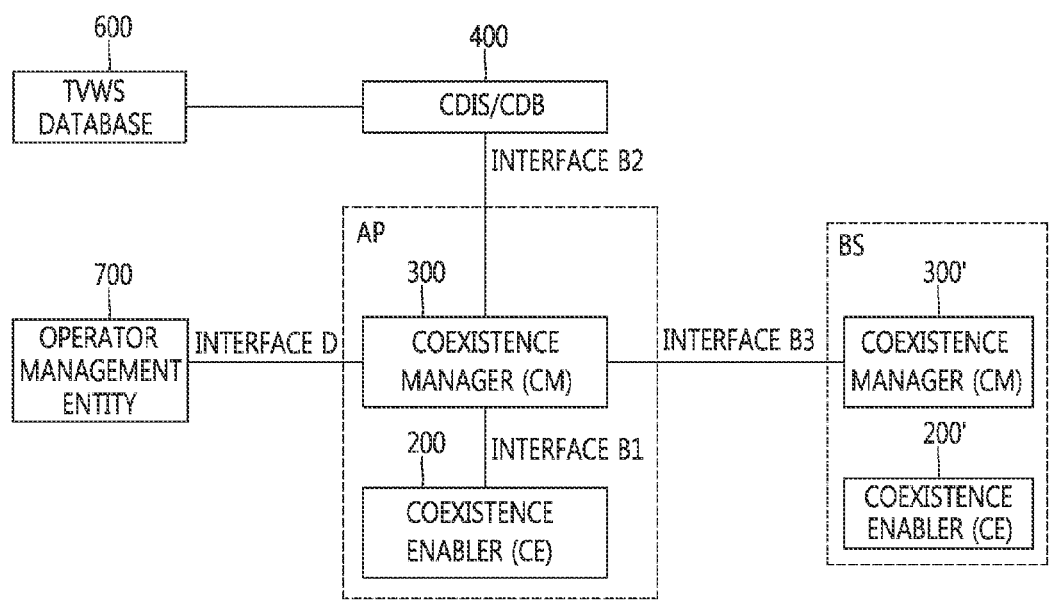
FIG. 2 is a block diagram illustrating a coexistence system according to another embodiment of the present description.

FIG. 2 is a block diagram illustrating a coexistence system according to another embodiment of the present invention.

As described with reference to FIG. 2, the coexistence enabler (CE) 200 and the coexistence manager (CM) 300 may be embedded in respective access points (AP) and base stations (BS).

Further, the CDIS/CDB 400 may be connected with the TVWS DB 600. The CDIS/CDB 400 may receive TV whitespace information from the TVWS DB 600 through the connection.

Figure 3:
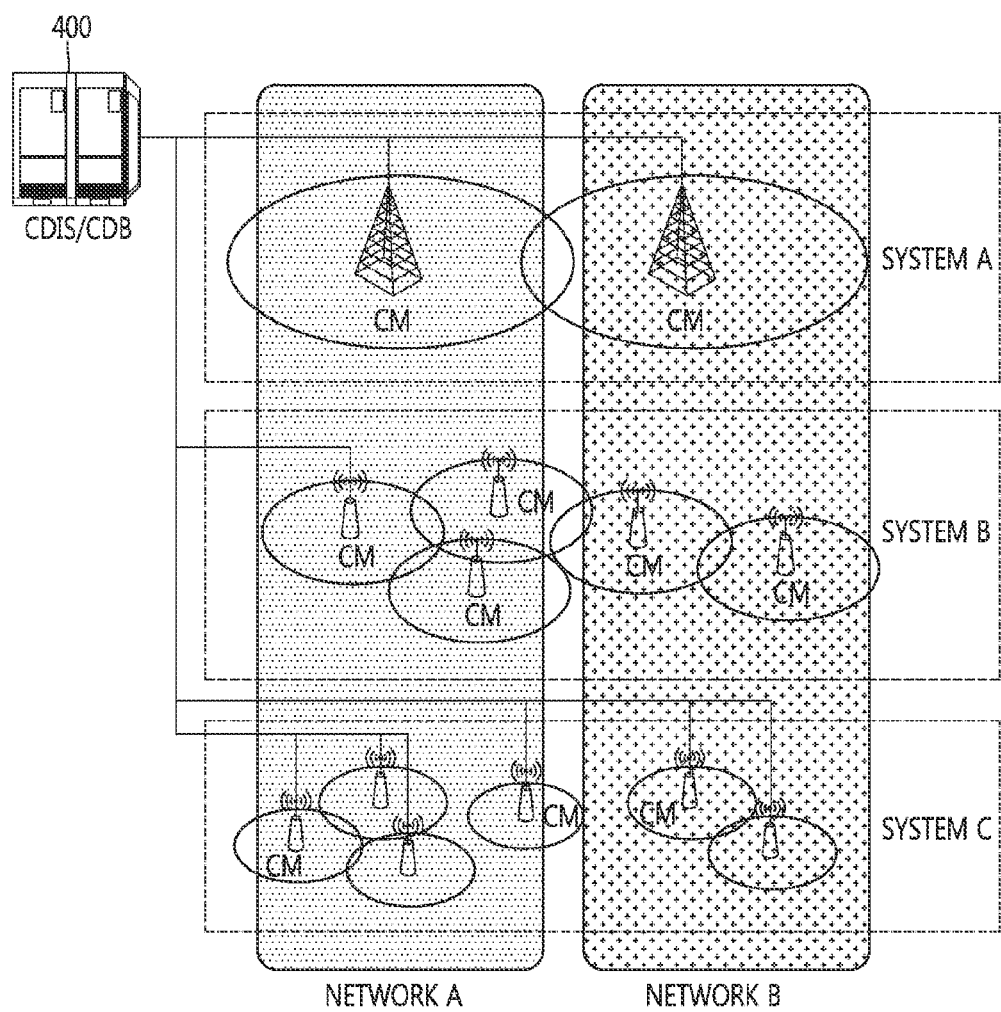
FIG. 3 illustrates an example in which the coexistence system is disposed according to an embodiment of the present description.

FIG. 3 illustrates an example in which the coexistence system according to the embodiment of the present invention is disposed.

As described with reference to FIG. 3, a network A and a network B vertically exist. Further, horizontally, a communication system A, a communication system B, and a communication system C exist. The communication system A, the communication system B, and the communication system C use different wireless access modes, that is, communication modes, respectively. For example, the communication system A may be a cellular communication, for example, a system such as a CDMA, a GSM, a CDMA-2000, a WCDMA, an LTE, an LTE-Advanced, and an IEEE 802.16. The system B may be a cellular system having a smaller size than the communication system A in a cell coverage. Further, the system B may be a system such as a Wi-Fi. The system C may be a cellular system having a smaller size than the communication system A in a cell coverage, for example, a femto cell. Coexistence managers CM exist in the communication system A, the communication system B, and the communication system C, respectively.

Meanwhile, the communication system A, the communication system B, and the communication system C geographically coexist in the network A, and exist even in the network B. As such, for coexistence, the CDIS/CDB 400 generates a coexistence map to transmit the coexistence map to the respective coexistence managers CM.

Figure 4:
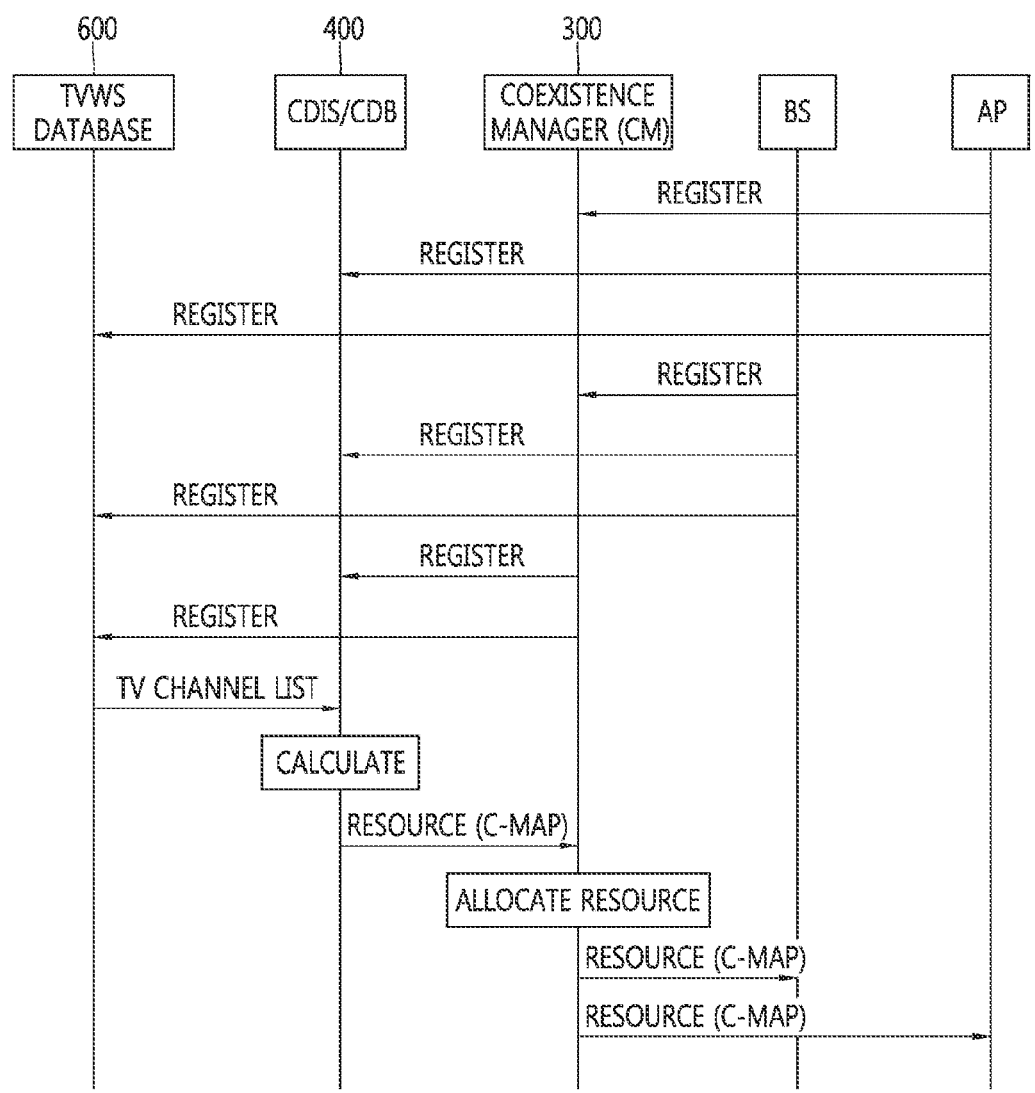
FIG. 4 illustrates an operation the coexistence system according to an embodiment of the present description.

FIG. 4 illustrates an operation of the coexistence system according to the embodiment of the present invention.

As described with reference to FIG. 4, the coexistence manager (CM) 300 is not embedded in the AP and the BS, but it is just exemplified and the coexistence manager (CM) 300 may be embedded in the AP and the BS. Further, the coexistence enabler (CE) 200 may be embedded in the AP and the BS.

Meanwhile, the AP and the BS are registered in the coexistence manager (CM) 300, the CDIS/CDB 400, and the TVWS DB 600.

The coexistence manager (CM) 300 performs registering in the CDIS/CDB 400 and the TVWS DB 600.

Meanwhile, the CDIS/CDB 400 may receive a channel list for broadcasting from the TVWS DB 600. The channel list may be frequency information for broadcasting. Further, the channel list may include an operating channel of broadcasting and information on transmit power limitation.

The CDIS/CDB 400 verifies whether the AP and the BS coexist with each other in any area by using position information of the AP and the BS and available channel information. When the AP and the BS coexist with each other, the CDIS/CDB 400 may calculate a coverage diameter of the AP and the BS, allocate different kinds of access points positioned in the any area, that is, channels (or resources) usable in the AP and the BS, or one or more frequency bands, and generate and transmit information on the channel (or resource) and the band, for example, the coexistence map.

Figure 5:
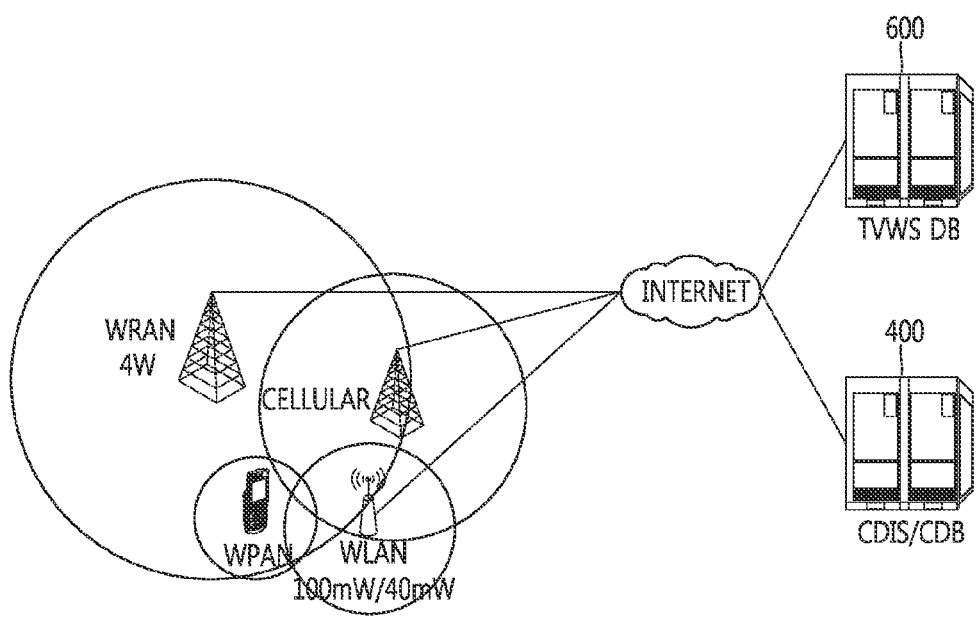
FIG. 5 illustrates another example in which the coexistence system is disposed according to an embodiment of the present description.

FIG. 5 illustrates another example in which the coexistence system according to the embodiment of the present invention is disposed.

As described with reference to FIG. 5, the coexistence manager CM or the CDIS/CDB 400 may adjust many APs to coexist on the wireless. The many APs may be connected with the CDIS/CDB 400 by using a physical access such as an Internet.

The CDIS/CDB 400 may acquire channel information for broadcasting from the TVWS DB 600 as described above. Further, the CDIS/CDB 400 may acquire channel information for broadcasting in a specific geographic area, for example, a broadcasting channel set. Further, the CDIS/CDB 400 may calculate a coexistence contour. Particularly, the coexistence contour may have a neighbor searching function on other systems operating on a whitespace for TV broadcasting or a frequency for TV broadcasting.

Further, the CDIS/CDB 400 may generate a coexistence white space map or a coexistence map as described above. Further, the CDIS/CDB 400 may provide common clock information. Further, the CDIS/CDB 400 may provide information for temporal synchronization between other systems.

The CDIS/CDB 400 may provide parameters for a wireless range and an interference range of each device. The CDIS/CDB 400 may provide a parameter for the coexistence contour described above. The CDIS/CDB 400 may identify neighboring network devices for coexistence between other systems. The CDIS/CDB 400 may provide information on transmission power, an antenna height, and other physical parameters of each network.

Figure 6:
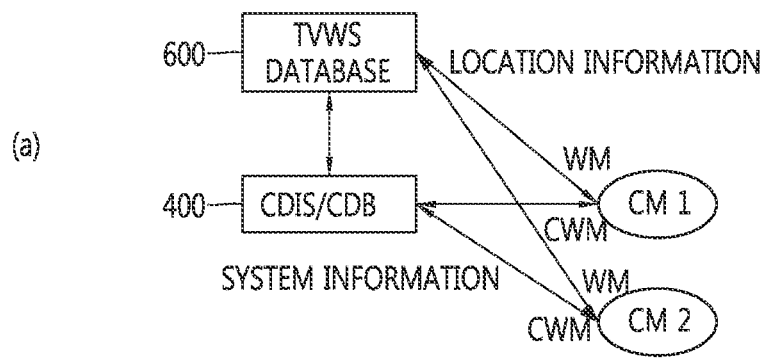
FIG. 6 is an exemplary diagram illustrating an operation of a CDIS/CDB 400.
Figure 6:
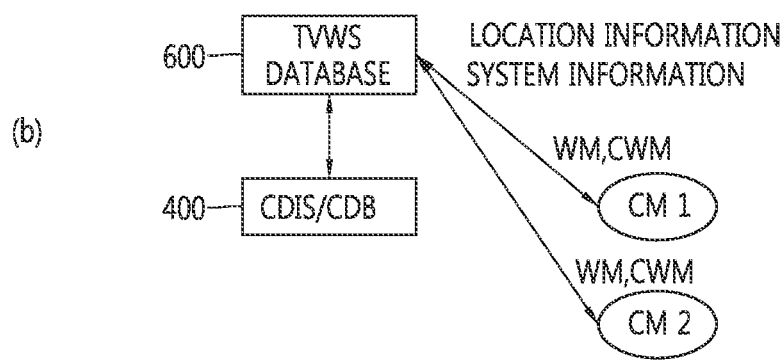

Sub-figures (a) and (b) of FIG. 6 are exemplified diagrams illustrating an operation of the CDIS/CDB 400.

As described with reference to the sub-figure (a) of FIG. 6, a first coexistence manager CM1 and a second coexistence manager CM2 exist, and are connected with the TVWS DB 600 and the CDIS/CDB 400, respectively. The first coexistence manager CM1 and the second coexistence manager CM2 receive position information and the frequency information for broadcasting, for example, information on a whitespace map (WM) from the TVWS DB 600. The whitespace map may mean information on an empty frequency band which is not used by a broadcasting business operator in VHF and UHF frequency bands distributed for TV broadcasting.

Meanwhile, the CDIS/CDB 400 is connected with the TVWS DB 600 to receive the frequency information for broadcasting, for example, the whitespace map from the TVWS DB 600. In addition, the CDIS/CDB 400 may generate the coexistence whitespace map (CWM) or the coexistence map as described above, based on the frequency information for broadcasting, for example, the whitespace map. In addition, the generated coexistence whitespace map (CWM) or coexistence map may be transferred to the first coexistence manager CM1 and the second coexistence manager CM2.

Meanwhile, as described with reference to the sub-figure (b) of FIG. 6, the first coexistence manager CM1 and the second coexistence manager CM2 are connected with the TVWS DB 600. In addition, the TVWS DB 600 may be connected with the CDIS/CDB 400.

The CDIS/CDB 400 may transfer the aforementioned coexistence whitespace map (CWM) or coexistence map to the TVWS DB 600, and the TVWS DB 600 may transfer the received coexistence whitespace map (CWM) or coexistence map to the first coexistence manager CM1 and the second coexistence manager CM2. In this case, the TVWS DB 600 may transfer the received coexistence whitespace map (CWM) or coexistence map which is assumed as the frequency information for broadcasting, for example, the whitespace map.

Alternately, the TVWS DB 600 may transfer the received coexistence whitespace map (CWM) or coexistence map and the frequency information for broadcasting, for example, the whitespace map to the first coexistence manager CM1 and the second coexistence manager CM2. In this case, when the first coexistence manager CM1 and the second coexistence manager CM2 receive the received coexistence whitespace map (CWM) or coexistence map and the frequency information for broadcasting, for example, the whitespace map, the first coexistence manager CM1 and the second coexistence manager CM2 may select and use an appropriate thing thereof.

Figure 7:
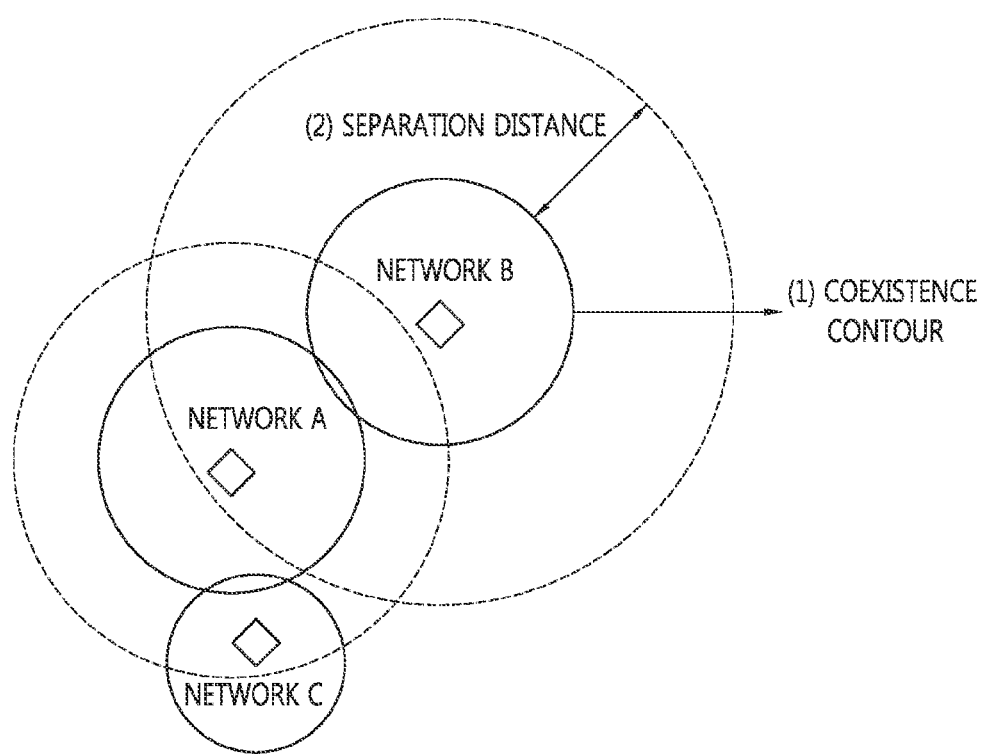
FIG. 7 is an exemplary diagram illustrating a coexistence contour.

FIG. 7 is an exemplified diagram illustrating a coexistence contour.

As described with reference to FIG. 7, a network A, a network B, and a network exist in close to each other. A coexistence contour of each network is illustrated by a solid line, and a separation distance of each network is illustrated by a dotted line. The coexistence contour is determined by a characteristic of each network itself. Meanwhile, the separation distance may be determined by a characteristic with other networks. As described with reference to FIG. 6, the coexistence contours of the network A and the network B do not contact each other, and the coexistence contours of the network A and the network C are partially overlapped with each other.

Figure 8:
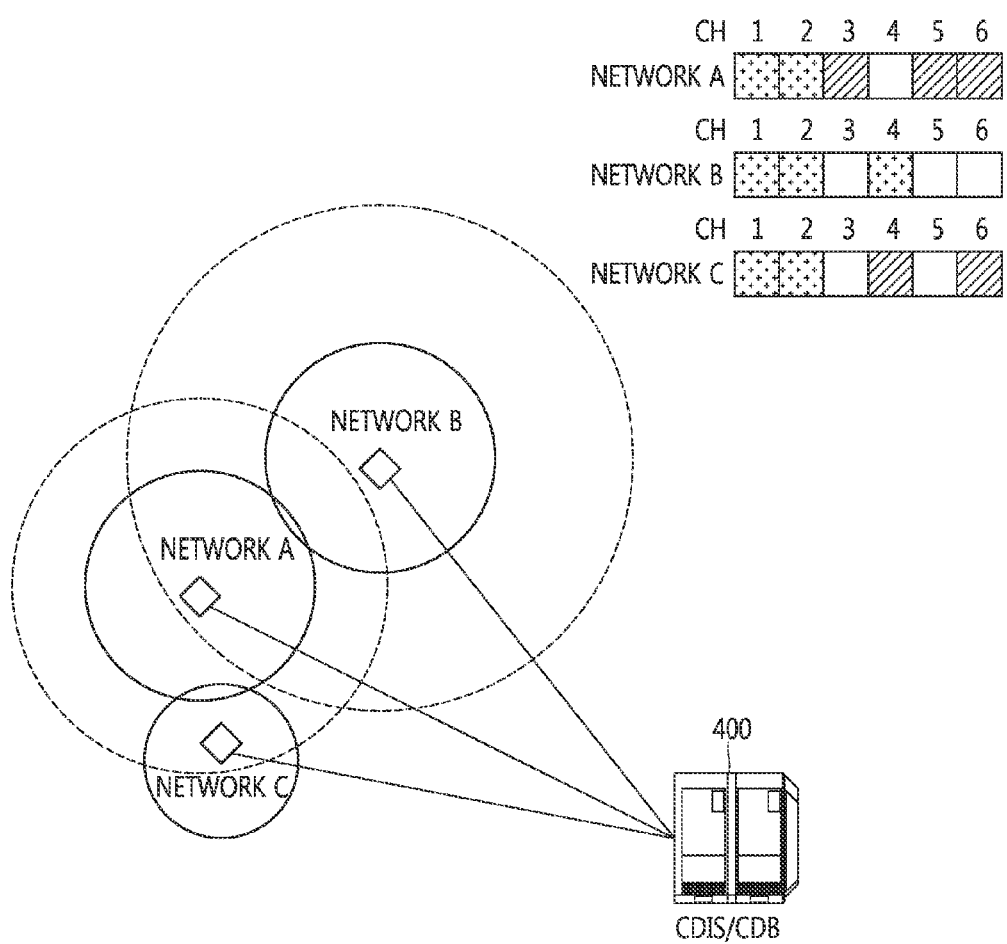
FIG. 8 illustrates an example a coexistence whitespace map (CWM) or a coexistence map under an environment of FIG. 7.

FIG. 8 illustrates an example of the coexistence whitespace map (CWM) or coexistence map in an environment of FIG. 7.

As illustrated in an upper right of FIG. 8, it is assumed that channels 1 to 6 exist. In this case, it is assumed that the channel 1 and the channel 2 are using channels for broadcasting according to the frequency information for broadcasting, for example, the whitespace map.

The CDIS/CDB 400 transmits the coexistence whitespace map (CWM) or coexistence map representing that the channel 4 is an idle channel to the network A, as illustrated in the drawing. As a result, when it is determined that the network A uses the channel 4, the CDIS/CDB 400 transmits the coexistence whitespace map (CWM) or coexistence map representing that the channels 3, 5, and 6 are idle channels to the network B. Accordingly, when it is determined that the network B uses, for example, the channel 6, the CDIS/CDB 400 transmits the coexistence whitespace map (CWM) or coexistence map representing that the channels 3 and 5 are idle channels to the network C.

As such, the CDIS/CDB 400 transmits the coexistence whitespace map (CWM) or coexistence map to the networks A, B, and C, respectively, and as a result, the networks A, B, and C may coexist with each other on the wireless.

Figure 9:
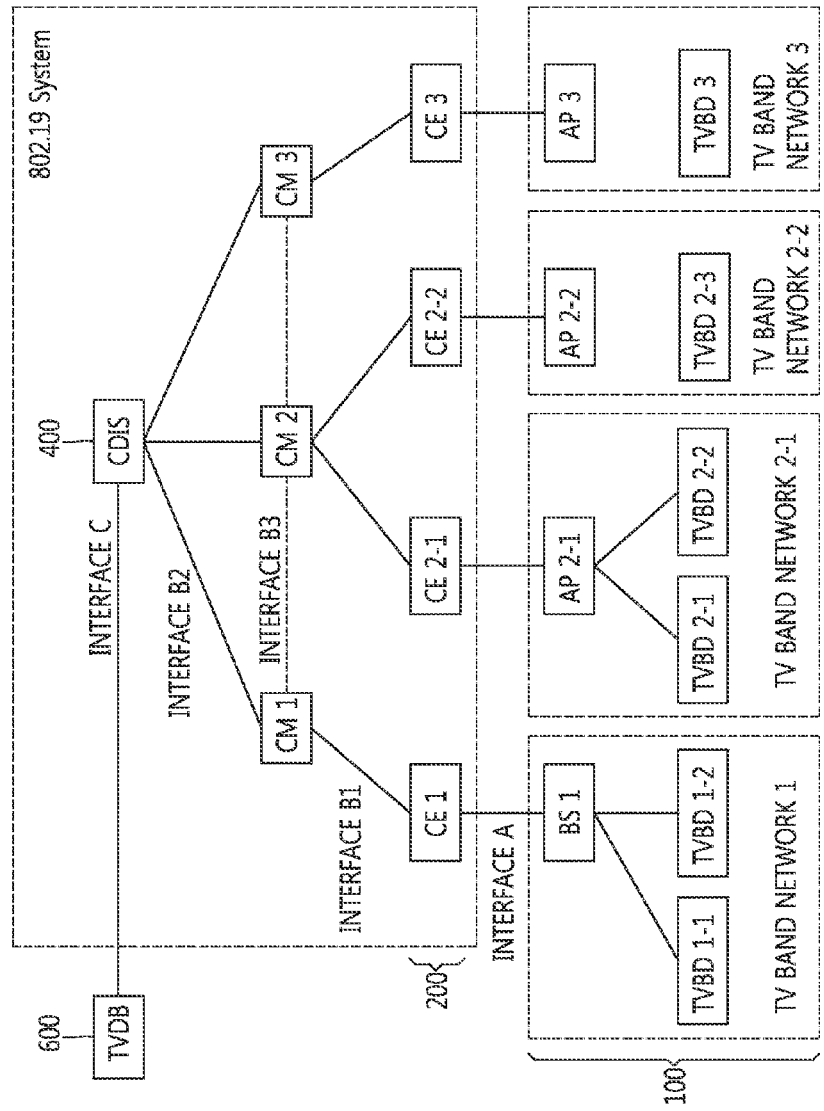
FIG. 9 is a block diagram of the coexistence system according to the embodiments disclosed in the present description.

FIG. 9 is a block diagram of a coexistence system according to the embodiments illustrated in this specification. As described above, in a coexistence system (for example, 802.19.1 system), when the entire system is exemplified based on three entities of the CDIS/CDB 400, the CM 300, and the CE 200, a structure of the coexistence system of FIG. 9 may be considered.

According to the proposed system structure, the 802.19 system includes the CDIS/CDB 400, the CM 300, and the CE 200, and the CDIS/CDB 400 is connected with an external TV whitespace database (TVDB) 600, and the CE 200 is also connected with an external TV band network (TVBN).

The TVDB 600 serves to store, maintain, and manage information on a spatially and temporally empty TV whitespace (TVWS) in the corresponding area in which the 802.19 system is installed.

The TVBN means a network using a resource of the TV whitespace (TVWS) in linked with the 802.19 system, and is configured by a plurality of TV band devices (TVBDs) based on the base station (BS) or the access point (AP) controlling the TVBN on the basis of the Cellular. An example of the TVBN includes IEEE 802.22 WRAN (Wireless Regional Area Network), IEEE 802.11af (Wireless Local Area Network), IEEE 802.15, IEEE 802.16 series, and the like.

The system structure will be described below with respect to a topology. In FIG. 9, the 802.19 system is connected to the TVDB 600 which is a database existing outside of the 802.19 system. The 802.19 system is connected with the TVBN performing communication by using the TV whitespace (TVWS), and a structure taking on one kind of communication system per CM of the 802.19 system is assumed. Therefore, one TVBN limited as the same kind of system may be included in one CM 300, and many TVBNs may be included. The kind of system may be 802.22 or 802.11af as the example, but is not limited thereto, and includes all wireless communication systems which are operable in the TVWS. Further, since the CE 200 connects the CM 300 and the TVBN, one CE 200 per TVBN is connected. Meanwhile, the TVBN is considered as a form in which the BS or AP serving as central control exists and many TVBD networks or devices 100 are concentrated in the BS or AP.

The CDIS/CDB 400 serves to collect and manage information required for coexistence with the TVDB 600 and provide the corresponding information to the CM 300. The CDIS/CDB 400 is connected with the TVDB network or device 100 through an interface C, and requests and acquires information on an available channel (a channel usable by the TVDB networks or devices 100 without spatially and temporally using TV channels) required for coexistence to the TVDB 600. On the other hand, the CDIS/CDB 400 is connected with the CMs 300 through an interface B2. The CDIS/CDB 400 designates a predetermined band to the CM 300 to be used among the managed available channels. As a result, since the CM 300 uses only the currently empty channel, interference for the TV system is avoided. If many CMs 300 connected with the CDIS/CDB 400 exist, respective CMs 300 need to be divided, and when available channels are allocated to the CMs 300, the available channels need to be divided to the CMs 300 so that the available channels are not overlapped with each other.

The CM 300 performs decision making required for coexistence as a core function, and in more detail, acquires information on a required channel from the CDIS/CDB 400 and then allocates the available channels to the TVDB networks or devices 100, and performs control for coexistence. The CM 300 is connected with the CDIS/CDB 400 through the interface B2, and requests information on an available channel of the TV whitespace (TVWS) to the CDIS/CDB 400, and the requested CDIS/CDB 400 allocates channels to be occupied by the corresponding CM 300. Further, the CM 300 is connected with the CE 200 through the interface B1, and when the channel use request is received through the CE 200, the CM 300 determines whether any channel among the available channels received from the CDIS/CDB 400 is allocated to allocate the determined channel to the CE 200.

The CE 200 mainly serves to connect the CM 300 of the 802.19 system and an actual TVWS coexistence system. That is, the CE 200 transfers control commands for coexistence from the CM 300 so that the actual TVBN may be performed, and on the contrary, transfers the channel use request from the TVBN to the CM 300. The CE 200 is connected with the CM 300 through the interface B1, transfers the request for the channel use through the interface B1 to the CM 300, and receives channel allocation information decision-made by the CM 300 based on the channel use information acquired from the CDIS/CDB 400. Further, the CE 200 is connected with the BS or the AP taking on a control of the TVBN through the interface A. When the required channel request is received from the BS or the AP of the TVBN, the CE 200 receives the required channel request and converts the required channel request into a command in the 802.19 and transfers the converted command to the CM 300. On the contrary, when a coexistence command such as channel allocation information is sent from the CM 300, the coexistence command is converted into a command suitable for the corresponding coexistence system to be transferred to the BS or the AP of the TVBN. In the TVBN, the BS or the AP allocates a channel to the respective TVBD networks or devices 100 in accordance with a method defined in the corresponding system, and the allocated channel is used.

Sub-figures (a) and (b) of FIG. 10 are diagrams illustrating a channel use structure of the coexistence system according to the embodiments disclosed in the present description.

A TV channel basically has a bandwidth of 6 MHz in USA, 7 MHz in Europe, and 8 MHz in England. The embodiments disclosed in the present description may be applied to all TV channel bands, but hereinafter, for convenience of description, particularly, a TV channel band of 6 MHz is assumed.

A channel use structure of the TVBD networks or devices 100 as a secondary user sharing the TVWS needs to be suitable for the TV channel structure of 6 MHz unit. When describing the channel structure of the IEEE 802.22 WRAN and the IEEE 802.11af WLAN in which current standardization proceeds, the 802.22 WRAN uses a channel use of the same 6 MHz unit as the TV channel, but the 802.11af WLAN uses a channel of 5/10/20 MHz unit so as to maintain backward compatibility with the existing 802.11 WLAN system and the old system. In this case, many sequential channels of 6 MHz unit are added and used. For example, in the case of using a channel of 10 MHz, 12 10 MHz is allocated by adding two TV channels of 6 MHz, and a mode in which two bands of 1 MHz at both ends are not used is used.

A sub-figure (a) of FIG. 10 illustrates the 802.11 af WLAN system using a 5 MHz band, and a sub-figure (b) of FIG. 10 is a diagram illustrating an example of a channel use structure of the 802.11af WLAN system using a 10 MHz band. When the TVBD networks or devices 100 use different bandwidths, the channel use may be limited by distribution of sequential empty channels. An environment in which a 6 MHz 802.22 WRAN system using one TV channel in the TVWS which is an empty space of the TV channel like the sub-figure (a) of FIG. 10 and a 10 MHz 802.11af WLAN system using two TV channel like the sub-figure (b) of FIG. 10 coexist with each other may be considered.

The TV channel is first used in the TV system which is a primary user. However, since the channel which is not spatially and temporally used exists, channels which may be used by the TVBD networks or devices 100 exist. The channel used by the TV system is predetermined and may not be controlled. Further, the TVBD networks or devices 100 using the TVWS freely use channels favorable to the TVBD networks or devices within a range which does not affect the primary user so long as a separate rule is defined and not limited.

Sub-figures (a) to (c) of FIG. 11 are conceptual diagrams for describing a channel fragmentation phenomenon which occurs in the coexistence system.

The use of the channel in the coexistence system shows a random distribution with respect to all channels, and as a result, a channel fragmentation problem occurs. A sub-figure (a) of FIG. 11 is a conceptual diagram illustrating a situation in which a lot of channel fragmentation phenomena occur. According to the sub-figure (a) of FIG. 11, although actually empty channels are sufficient as six, the channels are split and distributed one by one. Therefore, a problem in which a 10 MHz 802.11 af WLAN system using two channels which are bound cannot use the channel occurs.

On the contrary, a sub-figure (b) of FIG. 11 is a conceptual diagram illustrating a case in which few channel fragmentation phenomena occur. According to the sub-figure (b) of FIG. 11, the number of empty channels is six similarly as illustrated in the sub-figure (a) of FIG. 11, but five channels among six channels are consecutively distributed. Therefore, the 10 MHz 802.11af WLAN system using two channels which are bound may be used.

As such, in regarding whether the TVBD network or devices 100 are capable of using TVWS channels the presence or absence of consecutive empty channels may be more important than the number of empty channels. Therefore, a method that can solve the channel fragmentation problem is required. To this end, according to the embodiments disclosed in the description, when a wideband system (a system using consecutive plural TV channels which are bound) cannot use the channel due to the channel fragmentation phenomenon, the coexistence system commands a narrowband system (a system using only one TV channel) using the channel to change the currently used channel to thereby create consecutive empty channels.

A sub-figure (c) of FIG. 11 is a conceptual diagram for describing a process in which the coexistence system solves the channel fragmentation phenomenon according to the embodiments disclosed in the present description. Referring to the sub-figure (c) of FIG. 11, a coexistence system having a total of nine TV channels may be assumed. Herein, a TV may use four channels 1011 to 1014. Further, two channels 1021 and 1022 among channels not used by the TV may be used by the narrowband system using only one channel. Therefore, three channels 1031 to 1033 are left as empty channels. However, when the wideband that needs to use two consecutive channels intends to access the channels, there is no available channel due to the aforementioned channel fragmentation phenomenon. In this case, when one channel 1021 between one empty channel 1032 and a channel used by an adjacent narrowband system is transferred to another empty channel 1031, the wideband system may access the channels 1032 and 1021.

According to the aforementioned operation of the coexistence system, one among the existing used channels is selected and transferred to another channel. Herein, it is important to decide which used channel is selected and which empty channel the selected used channel is transferred to in the used narrowband system. An incentive based mechanism and an actual channel quality based mechanism may be presented with respect to a reference for deciding a narrowband user and a narrowband channel as targets of channel transferring.

The incentive based mechanism in channel selection is a method that enables channel selection by a voluntary method not according to a determined rule at the center by granting synchronization so that systems using the existing channel move to another empty channel. A reason for giving an incentive to the narrowband system which is to move the channel will be described below. First, each narrow band system needs to stop transmission while moving the used channel. Since each narrowband system make a loss until starting transmission again after moving the channel, the loss needs to be compensated. Second, there is a high probability that the system occupying the channel will select and use the channel so as to obtain a result which is advantageous thereto. In such a situation, when the channel is transferred, since a predetermined part of a profit of the system is yielded for profits of other users and all users, the yielded profit needs to be compensated. When there is a motivation based on the incentive, channel selection and transferring may be smoothly achieved in a coexistence system user oriented operation.

Channel selection and transferring based on the incentive may be controlled by distributing a predetermined quantity of credits for each user and controlling the distributed credits. In an initial stage, the coexistence system distributes the same quantity of credits for each user. It is assumed that a credit of an i-th user in a k-th slot is $C_i(k)$. In this case, when the corresponding user becomes the target of channel transferring to vacate a used channel and move to another channel, a credit of the user is increased by one unit. Such a process may be expressed by Equation 1 below.

$$c_i(k+1) = c_i(k) + 1 \qquad \text{[Equation 1]}$$

A narrowband user which frequently performs channel transferring secures a lot of credits in order for the wideband user to use the channel while performing such a process. A priority to access the channel is given to the user in an incentive type. That is, when users are more than available empty channels or when the users compete with each other in order to use a better channel, a channel using authority or a channel selecting authority is given to a user having a high credit. According to a multi-access implementation mechanism, when the user may be selected, the user may be decided by a mechanism of Equation 2 below.

$$\hat{i} = \operatorname*{argmax}_{i} c_i(k) \qquad \text{[Equation 2]}$$

Equation 2 presents a reference for select an $\hat{i}$-th narrowband user who will transfer the channel when the wideband user accesses the channel. Moreover, a reference for the $\hat{i}$-th narrowband user selected as the target of channel transferring to transfer the channel and select a channel to be used is also required. In this regard, a priority of accessing the channel is given to a user having a high incentive when users who intend to access the channel are more than available channels in the incentive based mechanism. On the contrary, the user needs to decide which channel among usable channels need to be selected when the users who intend to access the channel are less than the available channels, and the decision is performed not by a central controller such as the CM 300 but by the user who intends to access the channel of himself/herself, and all mechanisms suitable therefor may be used. Therefore, a channel which the narrowband user will use after transferring the channel is arbitrarily selected and used among channels that satisfy a minimum channel bandwidth which the narrowband user will use.

The above presented incentive based method is a mechanism that gives a channel selection right by compensating channel transferring with the credit to induce channel transferring. On the contrary, the channel quality based method induces channel transferring by transferring the current channel to a channel having a channel quality which is more advantageous to individual users to allow the wideband system to access the channel. Communication interruption is compensated during the channel transferring by transferring the currently used channel to a better channel to give the motivation to the user who transfers the channel similarly as the incentive based mechanism.

Channel selection and transferring based on the channel quality are subjected to a process of finding a user $\hat{i}$ and a channel $\hat{j}$ to be used at that time in which the channel gain is largest after transferring the channel as compared with a channel gain currently used by each user. When the process is expressed as an equation, the equation becomes Equation 3 below.

$$\{\hat{i}, \hat{j}\} = \operatorname*{argmax}_{i,j} \left( \frac{|h_{i,j}|^2}{|h_{i,j_0}|^2} \right) \qquad \text{[Equation 3]}$$

Herein, $|h_{i,j_0}|^2$ is a channel gain which the i-th user acquires before the channel transferring and $|h_{i,j}|^2$ is a channel gain which the i-th user acquires after the channel transferring.

The wideband user $\hat{i}$ who will transfer the channel and the channel $\hat{j}$ to which the corresponding user will move are decided through the presented incentive based mechanism and the channel quality based mechanism. A subject that takes charge in the process may be managed by an inter-system controller managing an overall disparate system or an intra-system controller managing the narrowband system.

When the wideband user sends a message indicating a channel access intention to the controller, the controller decides the channel transferring through at least one of the incentive based mechanism and the channel quality based mechanism. The controller sends a message instructing the $\hat{i}$-th narrowband user to transfer the current channel to the $\hat{j}$-th channel based on a decided result. The instructed $\hat{i}$-th narrowband user sends a message for reporting that the used channel is transferred to the $\hat{j}$-th channel to the controller after the channel transferring. The controller displays the $\hat{j}$-th channel used by the $\hat{i}$-th user in use and displays the channel which the $\hat{i}$-th user uses before the channel transferring in a usable state to allow the wideband user to use the channel.

FIG. 12 is a flowchart illustrating a channel allocation process adopting an adaptive channel selection technique of the coexistence system according to the embodiments disclosed in the present description.

The adaptive channel selection is defined through an operation and message exchange of the IEEE 802.19.1 system that manages users of respective coexistence systems using the channel and coexistence thereof and in particular, includes operations of three entities of the CDIS/CDB 400, the CM 300, and the CE 200 in the IEEE 802.19.1 system. However, the method proposed in the present description is not only applied to the defined structure but may also be applied to general systems and models.

First, the CM 300 may find the TV band device (TVBD) network or the devices 100 that exist in concert with the IEEE 802.19.1 system (S100). Herein, it is assumed that the TVBD network or the device 100 is constituted by two types of the narrowband (NB) system using a narrow-unit channel and the wideband (WB) system using a wide-unit channel. Since the CDIS/CDB 400 decides a channel to be allocated to the TVBD network or device 100, the CDIS/CDB 400 finds the TVBD network or device 100.

FIG. 13 is a flowchart specifically illustrating a process (S110) of discovering a TVBD network or device 100 illustrated in FIG. 12. Referring to FIG. 13, the CDIS/CDB 400 transmits a "CDIS call" message to the CM 300 that manages each TVBD network or device 100 through the interface B2 (S112). A "CDIS identifier" for distinguishing the corresponding CDIS/CDB 400 included in the "CDIS call" as a parameter.

The CM 300 that receives the message sends information on the TVBD network or device 100 managed thereby to notify the presence of the TVBD network or device 100 to the CDIS/CDB 400 (S114). This process is achieved by sending a "CM response" message from the CM 300 to the CDIS/CDB 400 through the interface B2. The "CM response" message includes parameters such as the "CM identifier" for distinguishing the CM 300 that manages each TVBD network or device 100 and a system type of the TVBD network or the device 100, and a channel width used by the corresponding system. The CDIS/CDB 400 receives the "CM response" message to complete the process of finding the TVBD network or the device 100.

Referring back to FIG. 12, the CM 300 obtained a currently usable channel set from the TVWS DB 600 (S120).

FIG. 14 is a flowchart specifically illustrating a process (S120) of acquiring a currently usable channel set illustrated in FIG. 12. The CDIS/CDB 400 sends a "channel query" message to the TVDB 600 through an interface C (S122) and includes a "CDIS identifier" and "geo-location information" on a region whether the corresponding CDIS/CDB 400 is present. The reason is that a regional difference in distribution of the TVWS needs to be reflected on the use of the TVWS.

When the TVDB 600 receives the "channel query" message, the TVDB 600 sends information on a usable channel which is present in the region where the corresponding CDIS/CDB 400 is positioned through the interface C again (S124). The TVDB 600 sends a "channel information" message to the CDIS/CDB 400 to achieve this process, which includes parameters an available channel list and an available duration in which each channel may be used.

Referring back to FIG. 12, the CDIS/CDB 400 checks channels being used by the TVBD network or devices 100 (S120). This process does not require a separate communication process with another entity because the CDIS/CDB 400 itself manages a list used by the TVBD network or devices 100.

The CDIS/CDB 400 waits for the TVBD network or device 100 to access the channel after initialization is finished (S130). A channel using request of the TVBD network or device 100 and channel allocation of the CM 300 need to be preceded in order for the TVBD network or device 100 to access the channel.

FIG. 15 is a flowchart specifically illustrating a process (S130) of receiving a channel allocation request illustrated in FIG. 12. The TVBD network or device 100 sends the "channel request" message to the CM 300 that manages the corresponding TVBD network or device 100 through an interface A and an interface B1 (S131 and S132). The message uses a TVBD network or device identifier and the number of required channels as parameters. The CM 300 transfers the "channel query" message including the CM identifier to the CDIS/CDB 400 through the interface B2 in order to determine a channel resource to be allocated for a channel request (S133). The CDIS/CDB 400 checks an empty channel through the available channel list received from the TVDB 600 in response to the channel request and notifies to the corresponding system information (the available channel list and the available duration) on a channel not used by another TVBD network or device 100 among empty channels. Subsequently, the CM 300 allocates the channel to the TVBD network or device 100 based on the channel information notified by the CDIS/CDB 400. The CDIS/CDB 400 allows the list of the allocated to be included in the channel list used by the TVBD network or device 100. The channel allocation information is transferred from the CDIS/CDB 400 to the TVBD network or device 100 through a process below. The CDIS/CDB 400 transfers the "channel information" message to the CM 300 that manages the TVBD network or device 100 as the target through the interface B2 (S134). In the case of the "channel information" message, an allocated channel list which the corresponding TVBD network or device 100 will use and the available duration of the corresponding channel as parameters. The CM 300 transfers a "channel allocation" message for allocating the channel through the interfaces B1 and A to the corresponding TVBD network or device 100 based on the received information (S135 and S136).

Referring back to FIG. 12, the TVBD network or device 100 determines whether the narrowband system enters at the time of accessing the channel (S210) and when the narrowband system enters, since there is no case the corresponding system cannot access an empty, one among empty channels is selected and used (S250). If the wideband system enters, it is determined whether a bandwidth required by the wideband system is present in the empty channel (S220). In step S230, when a channel which conforms to the condition is present, the channel may be used as it is (S250), but if only narrow empty channels which the wideband system cannot use are present, it is impossible for the wideband system to use the channel due to the channel fragmentation phenomenon. When this case occurs, a used channel of the wideband system used adjacent to the empty channel is transferred to another empty channel to secure a space which the wideband system enters and thereafter, the wideband system accesses the space (S240). Selection of the narrowband user as the target of the channel transferring and the channel to which the corresponding user moves are decided according to a rule defined in at least one of Equation 2 and Equation 3. A channel to be transferred decided according to the rule is transferred to the corresponding narrowband user to achieve the channel transferring.

FIG. 16 is a flowchart specifically illustrating a channel transferring process (S240) illustrated in FIG. 12.

The TVBD network or device 100 sends the "channel request" message to the CM 300 that manages the corresponding TVBD network or device 100 through an interface A and an interface B1 (S131 and S132).

A channel request for the wideband system is made by the TVBD network or device 100, but when only the narrowband channel is left, the CM 300 transfers the narrowband system to the narrowband channel and decides the channel transferring of allocating the made wideband channel.

Thereafter, the CM 300 transfers a "channel transfer query" message to vacate a currently used channel and transfer the empty channel to another channel to the TVBD network or device 100 that currently uses the channel to be transferred through the CDIS/CDB 400 through the CM 300 that services the corresponding TVBD network or device 100 (S241 and S242). In this case, a "channel before transfer" which is a channel number before transfer and a "channel after transfer" which is a channel number after transfer are transferred as parameters together with the CM identifier.

The CM 300 that receives the "channel transfer query" transfers related information to the TVBD network or device 100 using the corresponding channel through the "channel transfer" message and transfers channel numbers for the channel before and after transfer and usable durations of the corresponding channel as parameters (S243 and S244). When the channel is transferred, the CM 300 makes a decision and the CDIS/CDB 400 serves to transfer the message between the corresponding CM 300 and the CM 300 where the TVBD network or device 100 as the target of channel transferring is present.

FIG. 17 is a flowchart specifically illustrating a channel transferring process (S240) illustrated in FIG. 12.

Meanwhile, when the channel is transferred, if the CM 300 has latest channel information, a step of bringing channel information from the CDIS/CDB 400 may be omitted. In this case, the available channel information which the CM 300 itself has is transferred to the TVBD network or devices 100 (S243 and S244).

Referring back to FIG. 12, when the channel transferring (and channel allocation) is achieved, it is checked whether a channel usage state is changed through searching the TVWS DB 600 and thereafter, the same operation is repeated by returning to an initial state again.

FIG. 18 is a diagram illustrating a performance improvement verification test result of the coexistence system according to the embodiment disclosed in the present description.

Eight TV channels having 6 MHz were tested as a target and it was assumed that a WRAN uses one TV channel and a WLAN uses two TV channels. Each user's accessing the channel was decided by a transmission probability and it was assumed that a transmission probability $P_{TV}$ of a TV system is 0.2. Meanwhile, a result was observed while changing a transmission probability $P_{22}$ of the 802.22 WRAN system from 0.1 to 0.9 in order to find an available channel and a blocking probability of the 802.11af WLAN with channel occupation of the 802.22 WRAN.

Referring to FIG. 18, a graph 800 illustrates the blocking probability of the 802.11af WLAN system with a change of the transmission probability $P_{11}$ of the 802.11af WLAN system. It can be seen that in common, the blocking probability increases as the transmission probability of the 802.11af system increases and the reason is that the number of required channels to the number of usable channels increases as the transmission probability increases. When a short channel occurs, blocking occurs. Further, in a case in which the channel selecting method proposed in this research is used, the number of usable channels increases as compared with a case in which the channel selecting method is not used, it can be seen that the blocking probability decreases. It can be seen that the blocking probability decreases by 23.8% in a method proposed at a point where P11 is 0.5 as compared with the existing method.

In the aforementioned incentive based channel selection technique, when various users who intend to access the channel compete with each other, a multiple access control is required. In this case, instead of the centralized mechanism in which the controller decides which user uses the channel, a case of a distributed mechanism in which the users who compete with each other arbitrarily decide the use of the channel may be considered. That is, in a case of a random access in which each user decides whether to access the channel under a condition of communicating with other users, the access or not may be decided to be in proportion to a credit possessing a transmission probability of each user and this may be expressed as an equation as illustrated in Equation 4 below.

$$p_i = \frac{c_i(k)}{\sum_{l=1}^{n} c_l(k)} \quad \text{[Equation 4]}$$

Herein, $p_i$ represents a transmission probability of an i-th user and n represents the number of all users.

FIG. 19 is a block diagram of a coexistence manager (CM) 300 disclosed in the present description.

As illustrated in FIG. 19, the coexistence manager (CM) 300 includes a storage means 310, a controller 320, and a transceiving unit 330.

The storage means 310 stores the method according to the embodiments illustrated in FIGS. 1 to 18.

The controller 320 controls the storage means 310 and the transceiving unit 330. In detail, the controller 320 executes the methods stored in the storage means 310. In addition, the controller 320 transmits the aforementioned signals through the transceiving unit 330.

Although preferable embodiments of the present invention has been exemplarily described as above, the scope of the present invention is limited to only the specific embodiments, and as a result, various modifications, changes, or enhancements of the present invention can be made within the spirit of the present invention and the scope disclosed in the appended claims.

What is claimed is:

1. A method for allocating resource, performed by a manager device, comprising:
    receiving a channel allocation request from a first network or a device;
    deciding a second network or a device to transfer a used channel based on channel gains of respective networks or devices when there is no channel to be allocated to the first network or device;
    transferring a used channel of the second network or device to another channel and increasing a priority; and
    allocating the used channel of the second network or device to the first network or device.

2. The method of claim 1, wherein the step of deciding of the second network or device includes:
    determining whether the first network or device is a narrowband system.

3. The method of claim 1, wherein the step of deciding of the second network or device includes:
    receiving information on an available channel of the first network or device from a server.

4. The method of claim 1, wherein the step of deciding of the second network or device is a step of deciding the second network or device based on channel gains before channel transferring and channel gains after channel transferring of the network or devices.

5. The method of claim 4, wherein the step of deciding of the second network or device is performed based on a below equation $$\{\hat{i}, \hat{j}\} = \underset{i,j}{\operatorname{argmax}}\left(\frac{|h_{i,j}|^2}{|h_{i,j_0}|^2}\right).$$

(herein, $\hat{i}$ represents the second network or device, $\hat{j}$ represents a channel which the second network or device is to transfer, $|h_{i,j_0}|^2$ represents a channel gain which an i-th network or device obtains before channel transferring, and $|h_{i,j}|^2$ represents a channel gain which an i-th user obtains before channel transferring).

6. The method of claim 1,
wherein the priority is a reference for allocating a requested channel when there channels requested by the network or devices are more than available channels.

7. The method of claim 1, wherein the step of allocating further includes:
allocating at least one channel adjacent to the used channel of the second network or device to the first network or device.

8. The method of claim 1, wherein the manager device is a coexistence manager.

9. A manager device, comprising:
a transceiving unit receiving a channel allocation request from a first network or a device; and
a controller configured for:
deciding a second network or a device to transfer a used channel based on channel gains of respective networks or devices when there is no channel to be allocated to the first network or device,
transferring a used channel of the second network or device to another channel and increasing a priority, and
allocating the used channel of the second network or device to the first network or device.

10. The manager device of claim 9, wherein the controller is configured to determine whether there is no channel to be allocate dot the first network or device by determining whether the first network or device is a narrowband system.

11. The manager device of claim 9, wherein the controller is configured to determine whether there is no channel to be allocate dot the first network or device by receiving information on an available channel of the first network or device from a server.

12. The manager device of claim 9, wherein the controller is configured to decide the second network or device based on channel gains before channel transferring and channel gains after channel transferring of the network or devices.

13. The manager device of claim 12, wherein the controller is configured to decide the second network or device based on below equation $$\{\hat{i}, \hat{j}\} = \underset{i,j}{\operatorname{argmax}}\left(\frac{|h_{i,j}|^2}{|h_{i,j_0}|^2}\right).$$

(herein, $\hat{i}$ represents the second network or device, $\hat{j}$ represents a channel which the second network or device is to transfer, $|h_{i,j_0}|^2$ represents a channel gain which an i-th network or device obtains before channel transferring, and $|h_{i,j}|^2$ represents a channel gain which an i-th user obtains before channel transferring).

14. The manager device of claim 9, wherein the priority is a reference for allocating a requested channel when there channels requested by the network or devices are more than available channels.

15. The manager device of claim 9, wherein the controller is configured to further allocate at least one channel adjacent to the used channel of the second network or device to the first network or device.

* * * * *